(12) United States Patent
Imamura

(10) Patent No.: US 9,063,900 B2
(45) Date of Patent: Jun. 23, 2015

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Takeru Imamura, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 13/713,356

(22) Filed: Dec. 13, 2012

(65) Prior Publication Data

US 2013/0159621 A1   Jun. 20, 2013

(30) Foreign Application Priority Data

Dec. 15, 2011   (JP) .................................. 2011-274888

(51) Int. Cl.
*G06F 3/12*   (2006.01)
*G06F 12/16*   (2006.01)
*G06F 11/20*   (2006.01)
*G06F 21/80*   (2013.01)

(52) U.S. Cl.
CPC ............ *G06F 12/16* (2013.01); *G06F 11/2082* (2013.01); *G06F 11/2087* (2013.01); *G06F 21/80* (2013.01)

(58) Field of Classification Search
None
See application file for complete search history.

(56) References Cited

U.S. PATENT DOCUMENTS

| 5,101,492 A * | 3/1992 | Schultz et al. ............... 714/6.32 |
| 6,785,836 B2 | 8/2004 | Franklin et al. |
| 7,103,619 B1 * | 9/2006 | Rajpurkar et al. ............ 711/154 |
| 7,587,626 B2 * | 9/2009 | Terry et al. ................... 714/6.11 |
| 8,049,980 B1 * | 11/2011 | Emami ......................... 711/114 |
| 8,135,983 B2 * | 3/2012 | Hama .......................... 714/6.23 |
| 2007/0103984 A1 * | 5/2007 | Kavuri et al. ............ 365/185.17 |
| 2012/0198189 A1 * | 8/2012 | Akiba .......................... 711/162 |

FOREIGN PATENT DOCUMENTS

| CN | 1271898 A | 11/2000 |
| CN | 1848272 A | 10/2006 |
| JP | 2005275615 A | 10/2005 |
| KR | 10-2011-0010070 A | 1/2011 |

OTHER PUBLICATIONS

"Summarization of a technology of the Redundant Array of Independent Disks", (2003), No. 142.

* cited by examiner

*Primary Examiner* — Daniel Bernard
(74) *Attorney, Agent, or Firm* — Canon U.S.A., Inc. IP Division

(57) ABSTRACT

An information processing apparatus connected to a first storage device and a second storage device via a storage control device, the information processing apparatus includes a transfer unit configured to cause the storage control device to transfer to a rebuilding state after the setting unit has set the password for the second storage device.

16 Claims, 5 Drawing Sheets

INFORMATION PROCESSING APPARATUS, CONTROL METHOD, AND STORAGE MEDIUM

BACKGROUND OF THE INVENTION

1. Field of the Invention

The present invention relates to an information processing apparatus, a control method, and a storage medium.

2. Description of the Related Art

Information processing apparatuses use hard disk drives (HDDs) as storage media. A technique referred to as "mirroring" is used for improving reliability of HDDs. Based on the mirroring, the same data is written in two HDDs. In this way, even if one of two HDDs fails, if the failed HDD is replaced with a new HDD, rebuilding can be executed using the other HDD, and data can be thereby recovered to the same state as that before the HDD fails.

Further, a password may be set for an HDD to protect information in the HDD. The password is set to a unique one between the information processing apparatus and the HDD. The HDD for which once a password has been set, is locked when power source is turned on next time, and thereby access to data on the HDD is disabled, until the information processing apparatus is successful in an authentication of the password. Japanese Patent Application Laid-Open No. 2005-275615 discusses a technique for setting a password for each of the HDDs, in a configuration of performing the mirroring operation In the configuration of performing the mirroring operation, when the second HDD is newly attached in a state where the first HDD is already attached, if a user tries to set a password for the newly attached HDD, the following problem arises. When the HDD is newly attached, rebuilding is automatically started for the newly attached HDD. On the other hand, the newly attached HDD is not locked, and accordingly the newly attached HDD is in an accessible state, until the password is set for the newly attached HDD. Therefore, when the HDD is newly attached, in a state where a password is not set for the newly attached HDD, the rebuilding may be executed in some cases for the newly attached HDD.

SUMMARY OF THE INVENTION

The present invention is directed to preventing, when a second HDD is newly attached in a state where a first HDD is already attached, rebuilding from being executed for the newly attached HDD before a password is set for a newly attached HDD.

According to an aspect of the present invention, An information processing apparatus connected to a first storage device and a second storage device via a storage control device, the information processing apparatus includes a setting unit configured, when the storage control device operates in a single mode, to set an initial rebuilding function of the storage control device to OFF, an instruction unit configured, in a state where the initial rebuilding function of the storage control device is set to OFF, to instruct the storage control device to transfer to a mirroring mode, a generation unit configured to generate a password of the second storage device after the instruction unit has instructed the storage control device to transfer to the mirroring mode, a setting unit configured to set a password generated by the generation unit for the second storage device, and a transfer unit configured to cause the storage control device to transfer to a rebuilding state after the setting unit has set the password for the second storage device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

There are two conceivable situations where the second HDD is additionally attached, in addition to the first HDD that has already been attached. The first situation is where an additional HDD is newly attached to start mirroring. The second situation is where one of the HDDs fails in the midst of execution of the mirroring and the failed HDD is replaced with a new HDD.

In a first exemplary embodiment, measures to be taken in the situation where the additional HDD is newly attached to start the mirroring will be described.

In a second exemplary embodiment, measures to be taken in the situation where one of the HDDs fails in the midst of execution of the mirroring and the failed HDD is replaced with a new HDD will be described.

The first exemplary embodiment will be described.

Figure 1:
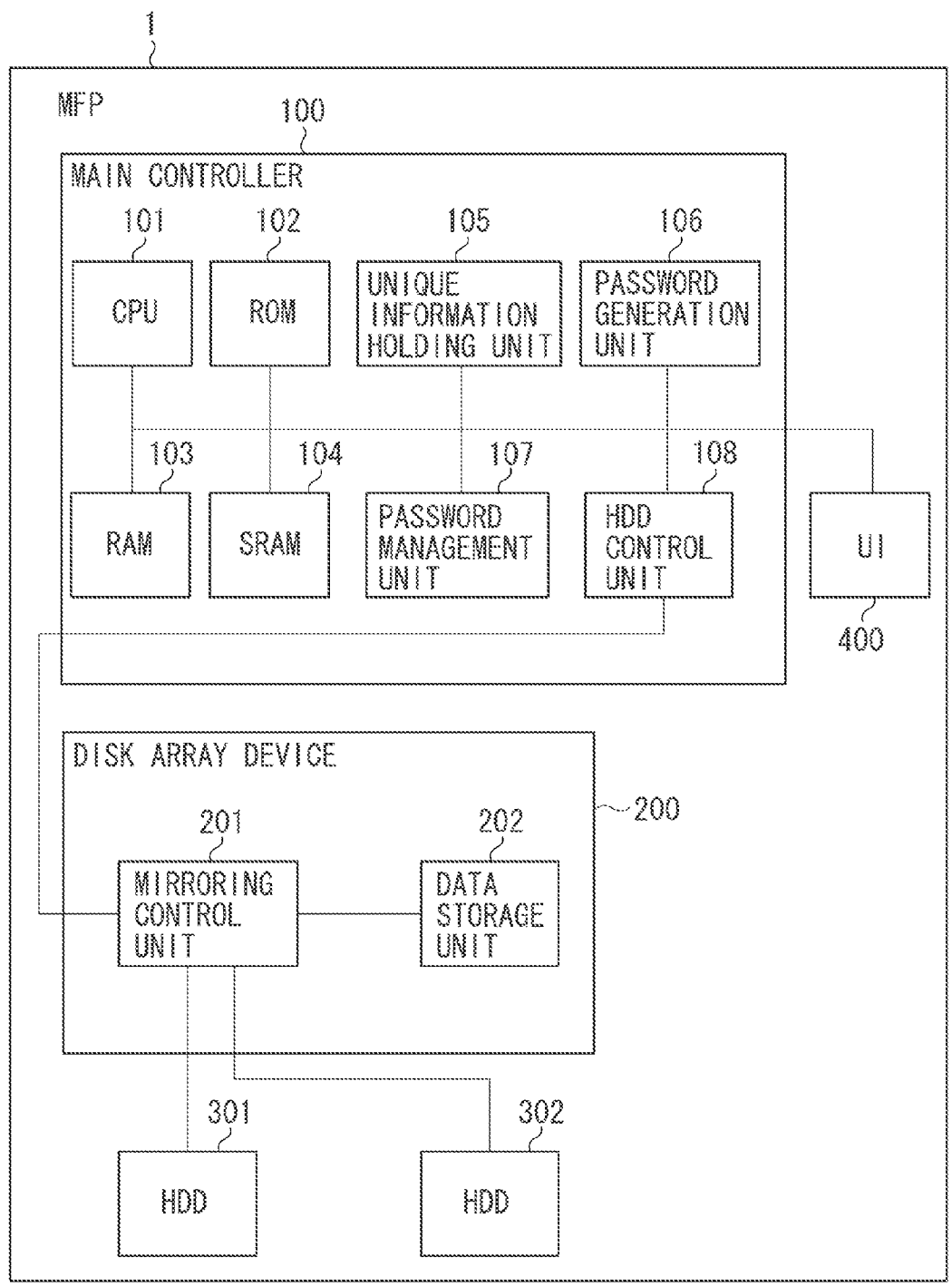
FIG. 1 is a block diagram illustrating a configuration of a multifunction peripheral (MFP).

FIG. 1 is a block diagram illustrating a configuration of the MFP 1.

The MFP 1 is an example of the information processing apparatus, and includes a main controller 100, a disk array device 200, an HDD 301, an HDD 302, a user interface (UI) 400, a scanner (not illustrated) and a printer (not illustrated). The information processing apparatus is not limited to an MFP (for example, the information processing apparatus may be a personal computer (PC)). The disk array device 200 and the HDD 302 are detachably attached to the MFP 1 as options. Further, the HDD 301 is assumed to be attached to the MFP 1 according to standard, but may be detachably attached to the MFP 1 as options. Alternatively, the disk array device 200, the HDD 301, and the HDD 302 may be present outside the MFP 1. When the disk array device 200 and the HDD 302 are not attached, the HDD 301 is directly connected to the main controller 100.

The main controller 100 comprehensively controls the MFP 1.

A central processing unit (CPU) 101 controls the units in the main controller 100, the disk array device 200, and the UI 400, for example.

A read-only memory (ROM) 102 stores programs used by the CPU 101.

A random access memory (RAM) 103 serves as a work area when the CPU 101 operates.

A static random access memory (SRAM) 104 stores various types of data used when the CPU 101 operates.

A unique information holding unit 105 holds unique information of the MFP 1.

A password generation unit 106 generates passwords, based on unique IDs acquired from the HDD and the MFP 1 unique information held by the unique information holding unit 105, according to commands of the CPU 101. A method for acquiring a unique ID from an HDD is assumed to use IDENTIFY DEVICE, which is a serial advanced technology attachment (SATA) command, but other methods may be used.

A password management unit 107 holds and manages the passwords generated from the password generation unit 106.

The units 105 through 107 are not separately present as hardware, but the CPU 101 may be allowed to execute these functions as a single unit.

An HDD control unit 108 performs transmission/reception of data between the main controller 100 and the disk array device 200.

The disk array device 200 performs write or read (storage control) of data to or from the HDD 301 and the HDD 302, according to instructions from the main controller 100.

A mirroring control unit 201 executes mirroring of the HDD 301 and the HDD 302, which will be described below with reference to FIG. 2. The mirroring is a technique in which the same data is written in two HDDs, and in this way, even if one of the HDDs fails, the data can be restored using data in the other HDD.

A data storage unit 202 stores various types of data used for mirroring. Examples of the data storage unit 202 include a flash ROM and an SRAM holding data with a button-type battery. The data storage unit 202 stores the data including the types and the number of HDDs, for example.

The HDD 301 (first storage device) and the HDD 302 (second storage device) are nonvolatile storage devices for storing data. Other storage devices than HDDs such as solid state drives (SSDs) may alternatively be used.

The UI 400 provides various types of information to users via a display and receives various instructions from users via buttons or the like.

Figure 2:
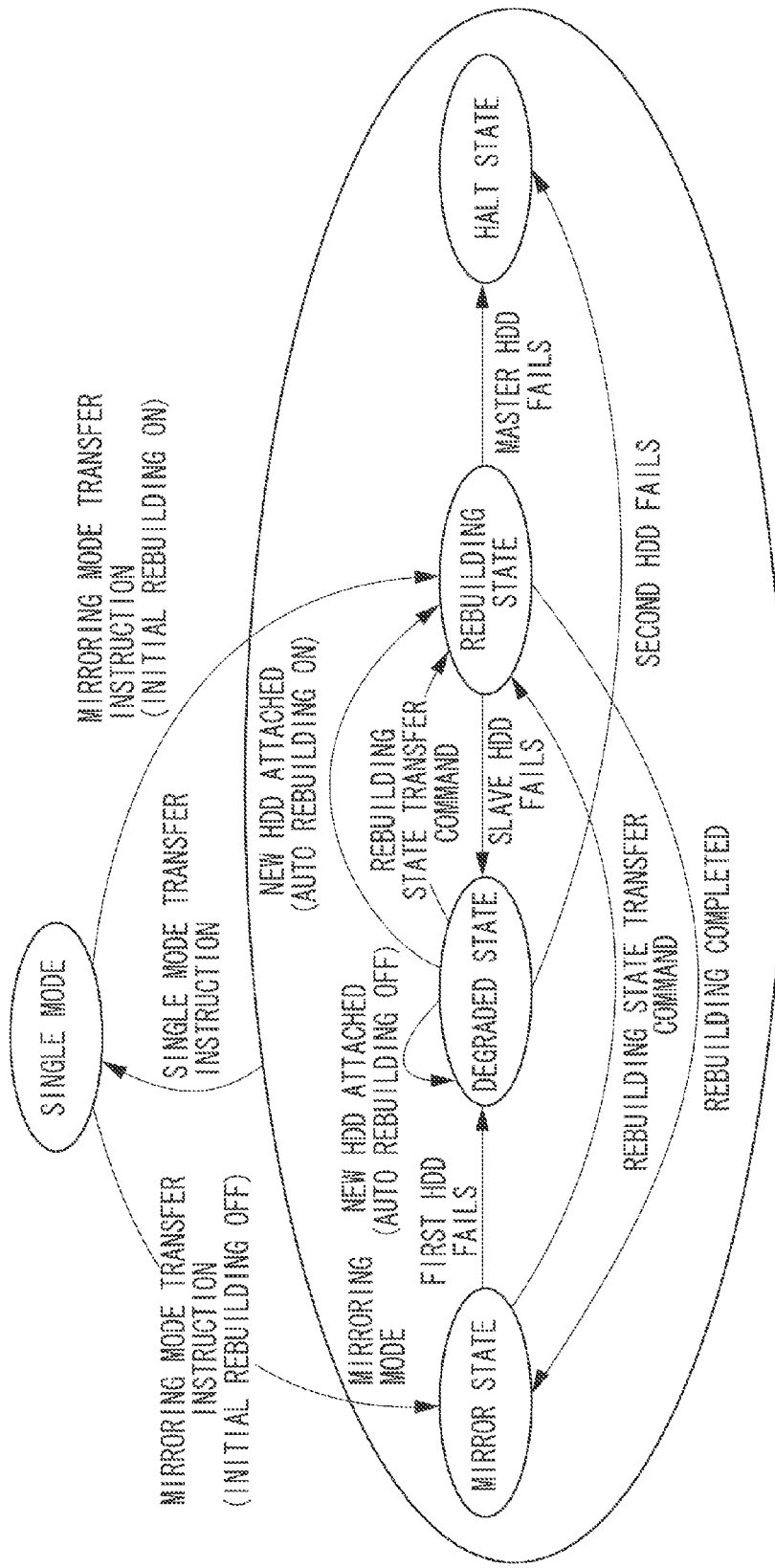
FIG. 2 is a state transition diagram of a disk array device.

FIG. 2 is a state transition diagram of the disk array device 200.

The disk array device 200 has two operation modes, which are a single mode and a mirroring mode.

In the single mode, the disk array apparatus 200 operates with a single HDD.

In the mirroring mode, the disk array apparatus 200 operates with two HDDs attached thereto. The mirroring mode includes four states: a mirror state, a degraded state, a rebuilding state, and a halt state.

The mirror state is a state in which the disk array apparatus 200 properly operates with two HDDs. In the mirror state, the disk array apparatus 200 executes reading only from a master HDD of the two HDDs, and executes writing on both the master HDD and a slave HDD. In the mirror state, if one (the first HDD) of the HDDs fails, the disk array apparatus 200 transfers to the degraded state. In the mirror state, if the CPU 101 gives command for transferring to the rebuilding state, the disk array apparatus 200 transfers to the rebuilding state.

The degraded state is a state in which the disk array apparatus 200 operates with only one (not-failed-yet HDD) of the HDDs and access to the other HDD (failed HDD) has not yet occurred. In the degraded state, in a state where an automatic rebuilding function is ON (default setting) and the new HDD is attached in substitution for the failed HDD, the disk array apparatus 200 transfers to the rebuilding state. In the degraded state, in a state where the automatic rebuilding function is OFF, even if the new HDD is attached in substitution for the failed HDD, the disk array apparatus 200 remains in the degraded state. In the degraded state, the CPU 101 gives command for transferring to the rebuilding state, the disk array apparatus 200 transfers to the rebuilding state. In the degraded state, if the not-failed-yet HDD (the second HDD) also fails, the disk array apparatus 200 transfers to the halt state.

The rebuilding state is a state in which the disk array apparatus 200 operates with one HDD (the not-failed-yet HDD previously attached), but copies (rebuilds) data from the one HDD to the other HDD (the HDD additionally attached to replace the failed HDD). In this case, the copy source HDD (the not-failed-yet HDD previously attached) is referred to as a master HDD, and the copy destination HDD (the HDD newly attached to replace the failed HDD) is referred to as a slave HDD. Upon completion of rebuilding data in the rebuilding state, the disk array apparatus 200 transfers to the mirror state. If the slave HDD fails in the rebuilding state, the disk array apparatus 200 transfers to the degraded state. If the master HDD fails in the rebuilding state, the disk array apparatus 200 transfers to the halt state.

The halt state is a state in which the disk array apparatus 200 cannot continue mirroring because both the HDDs have failed.

In the single mode, if the initial rebuilding function is ON (default setting) and the user gives instructions for transferring to the mirroring mode, the disk array apparatus 200 transfers to the rebuilding state. In the single mode, if the initial rebuilding function is OFF and the user gives instructions for transferring to the mirroring mode, the disk array apparatus 200 transfers to the mirror state.

In any one of the above states of the mirroring mode, upon receiving instructions for transferring to the single mode from the user, the disk array apparatus 200 transfers to the single mode.

Figure 3:
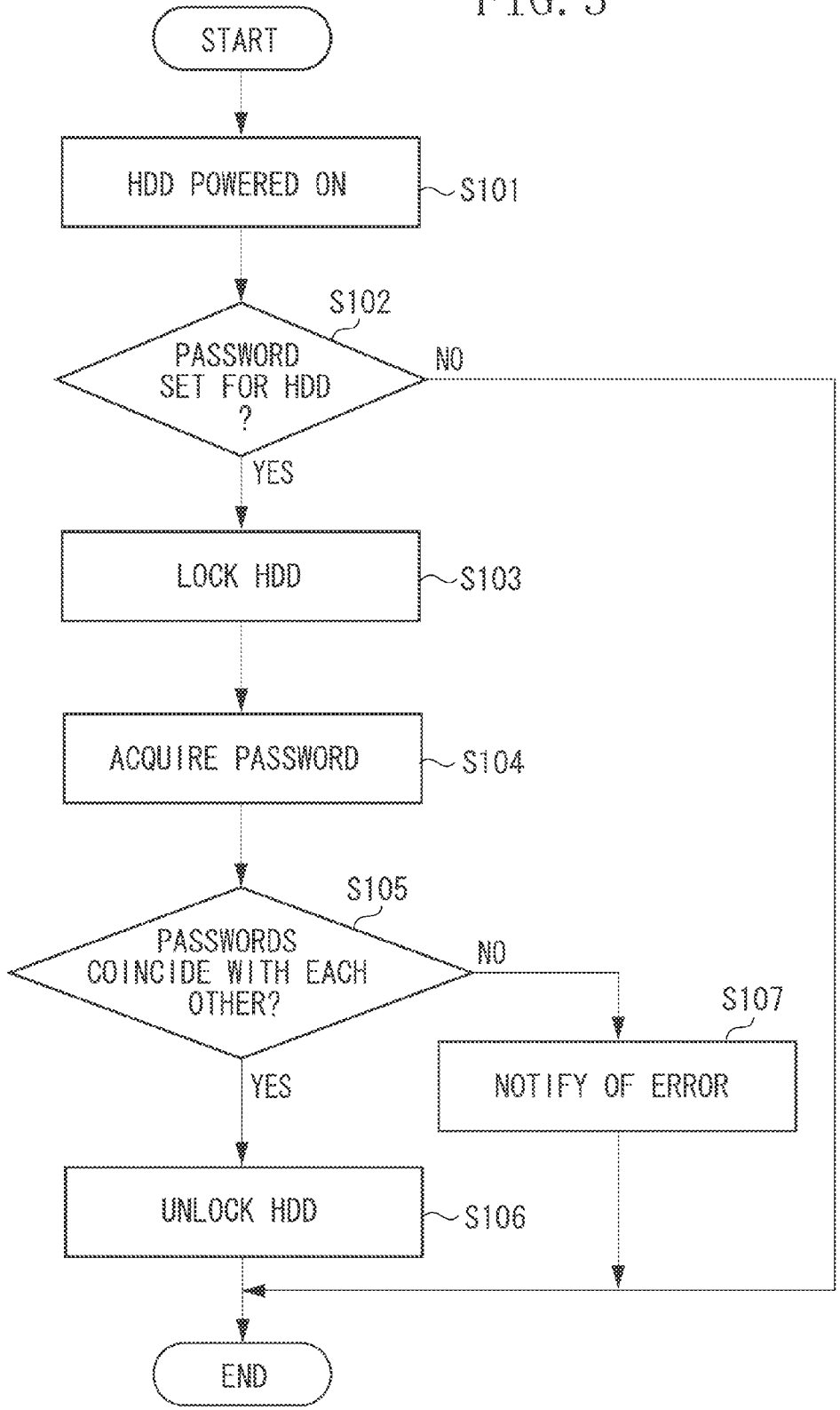
FIG. 3 is a flowchart illustrating a control process executed when an HDD is connected to the apparatus.

FIG. 3 is a flow chart illustrating a control process executed when an HDD is connected to the apparatus. The control according to the present flowchart is realized by mainly a microcomputer (not illustrated) built in the HDD executing the program.

First, in step S101, the HDD detects that the HDD is powered on.

Next, in step S102, the HDD determines whether a password is set for the HDD. If YES in step S102, the operation proceeds to step S103. If NO in step S102, the processing ends.

If YES in step S102, in step S103, the HDD locks the HDD, and disables access (read/write) to data on the HDD.

Next, in step S104, the HDD acquires the password held in the MFP 1.

Next, in step S105, the CPU 101 compares the password acquired in step S104 and the password set for the HDD to determine whether these passwords coincide with each other. This is an authentication of the HDD using the password. If YES in step S105, the operation proceeds to step S106. If NO in step S105, the operation proceeds to step S107.

In a case where a plurality of passwords is held in the MFP 1, the CPU 101 acquires these in sequence, and determines whether the acquired passwords coincide with the password set for the HDD. Then, of the plurality of passwords held in the MFP 1, if there is even one that coincides with the password set for the HDD, it is determined as YES in step S105. Further, of the plurality of passwords held in the MFP 1, if there is no password that coincides with the password set for the HDD, it is determined as NO in step S105.

If YES in step S105, in other words, if authentication of the HDD is successful, in step S106, the HDD unlocks the HDD, and the CPU 101 enables access (read/write) of data on the HDD. In other words, the HDD permits access to the HDD.

If NO in step S105, in other words, if authentication of the HDD fails, in step S107, the HDD notifies the MFP 1 of an error. In other words, the HDD prohibits access to the HDD. At that time, when the MFP 1 receives notification of the error from the HDD, the CPU 101 causes the UI 400 to display accordingly.

Figure 4:
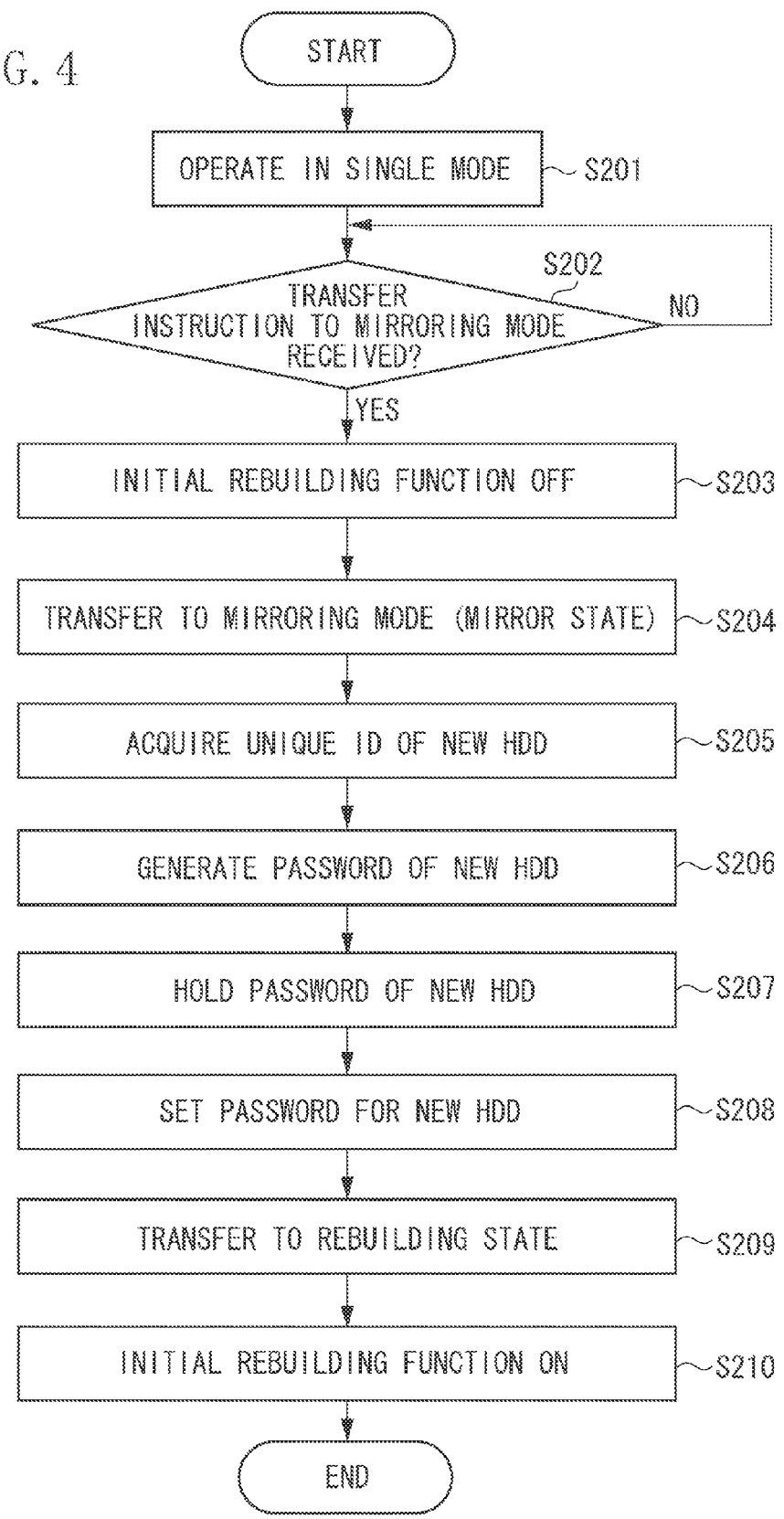
FIG. 4 is flowchart illustrating password setting of an HDD according to a first exemplary embodiment.

FIG. 4 is a flowchart illustrating password setting of the HDD according to the first exemplary embodiment. The control process according to the present flowchart is realized mainly by reading the program stored in the ROM 102 to the RAM 103 and to executing the program by the CPU 101.

First, in step S201, the disk array device 200 operates in the single mode.

Next, in step S202, the CPU 101 determines whether the CPU 101 has received an instruction for transferring to the mirroring mode from the user, via the UI 400. If YES in step S202, the operation proceeds to step S203. If NO in step S202, the CPU 101 stands by until the CPU 101 receives the instruction (YES in step S202).

If YES in step S202, in step S203, the CPU 101 accesses the data storage unit 202, via the mirroring control unit 201, and sets the initial rebuilding function to OFF. The initial rebuilding function is a function of executing the rebuilding, when the data storage unit 202 transfers from the single mode to the mirroring mode.

Next, in step S204, the CPU 101 sends a command to the mirroring control unit 201, and causes the disk array device 200 to transfer from the single mode to the mirroring mode. Upon receiving the command from the CPU 101, the mirroring control unit 201 checks ON/OFF state of the initial rebuilding function stored in the data storage unit 202. Next, the mirroring control unit 201 determines one of the states in the mirroring mode based on the result, and causes the disk array device 200 to transfer to the determined state. In the present exemplary embodiment, since the initial rebuilding function is set to OFF in step S203, the mirroring control unit 201 determines the mirror state as a state to which the disk array device 200 is transferred. Conventionally, since the initial rebuilding function is set to ON as a default setting, the mirroring control unit 201 determines the rebuilding state as a state to which the disk array device 200 is transferred. Thus, before a password is set for a new HDD, rebuilding is executed.

Next, in step S205, the CPU 101 sends a command to the mirroring control unit 201 and acquires unique ID of the newly attached HDD. Each HDD is assigned with a unique ID of its own, and the unique ID is previously stored when the HDDs are shipped from factories, for example. Thus, upon receiving the command from the CPU 101, the mirroring control unit 201 sends the unique ID of the new HDD to the RAM 103. Regarding the unique ID acquisition of the HDD, the mirroring control unit 201 autonomously acquires the unique ID, holds it on the data storage unit 202, and may output it from the data storage unit 202, upon receiving an IDENTIFY DEVICE command from the CPU 101.

Next, in step S206, the CPU 101 sends a command to the password generation unit 106, and causes the password generation unit 106 to generate a password, based on the unique ID acquired in step S205 and held in the RAM 103 and unique information of the MFP 1 held in the unique information holding unit 105.

Next, in step S207, the CPU 101 sends the password generated by the password generation unit 106 to the password management unit 107, which holds the password.

Next, in step S208, the CPU 101 set the password held in the password management unit 107 for the newly connected HDD, via the mirroring control unit 201.

Next, in step S209, the CPU 101 sends a command to the mirroring control unit 201 to cause the disk array device 200 to transfer from the mirror state to the rebuilding state. Upon receiving the command from the CPU 101, the mirroring control unit 201 causes the disk array device 200 to transfer to the rebuilding state, according to the command.

Next, in step S210, the CPU 101 accesses the data storage unit 202 via the mirroring control unit 201 and sets the initial rebuilding function to ON.

As described above, in the present exemplary embodiment, the CPU 101 performs control to prohibit execution of the rebuilding on the HDD, for a period until a password is set for the newly connected HDD.

In parallel with this, the CPU 101 may perform control to prohibit write of data on the HDD corresponding to write command from the main controller, for a period until a password is set for the newly connected HDD.

According to the first exemplary embodiment, in the situation where the additional HDD is newly attached to start the mirroring, the following becomes possible. Specifically, it becomes possible to prevent the rebuilding from being executed on the newly attached HDD before a password is set for the newly attached HDD.

In the second exemplary embodiment, in the midst of execution of mirroring, measures to be taken in the situation where one of the HDDs fails and the failed HDD is replaced with the new HDD will be described.

The block diagram illustrating a configuration of the MFP 1 is similar to that in the first exemplary embodiment which will be described above with reference to FIG. 1, and therefore redundant descriptions thereof will be avoided.

Further, the state transition diagram of the disk array device 200 is similar to that in the first exemplary embodiment, which will be described above with reference to FIG. 2, and therefore redundant descriptions thereof will be avoided.

Further, the flowchart illustrating a control process executed when the second HDD is newly attached while the first HDD is already attached is similar to that in the first exemplary embodiment, which will be described above with reference to FIG. 3, and therefore redundant descriptions thereof will be avoided.

Figure 5:
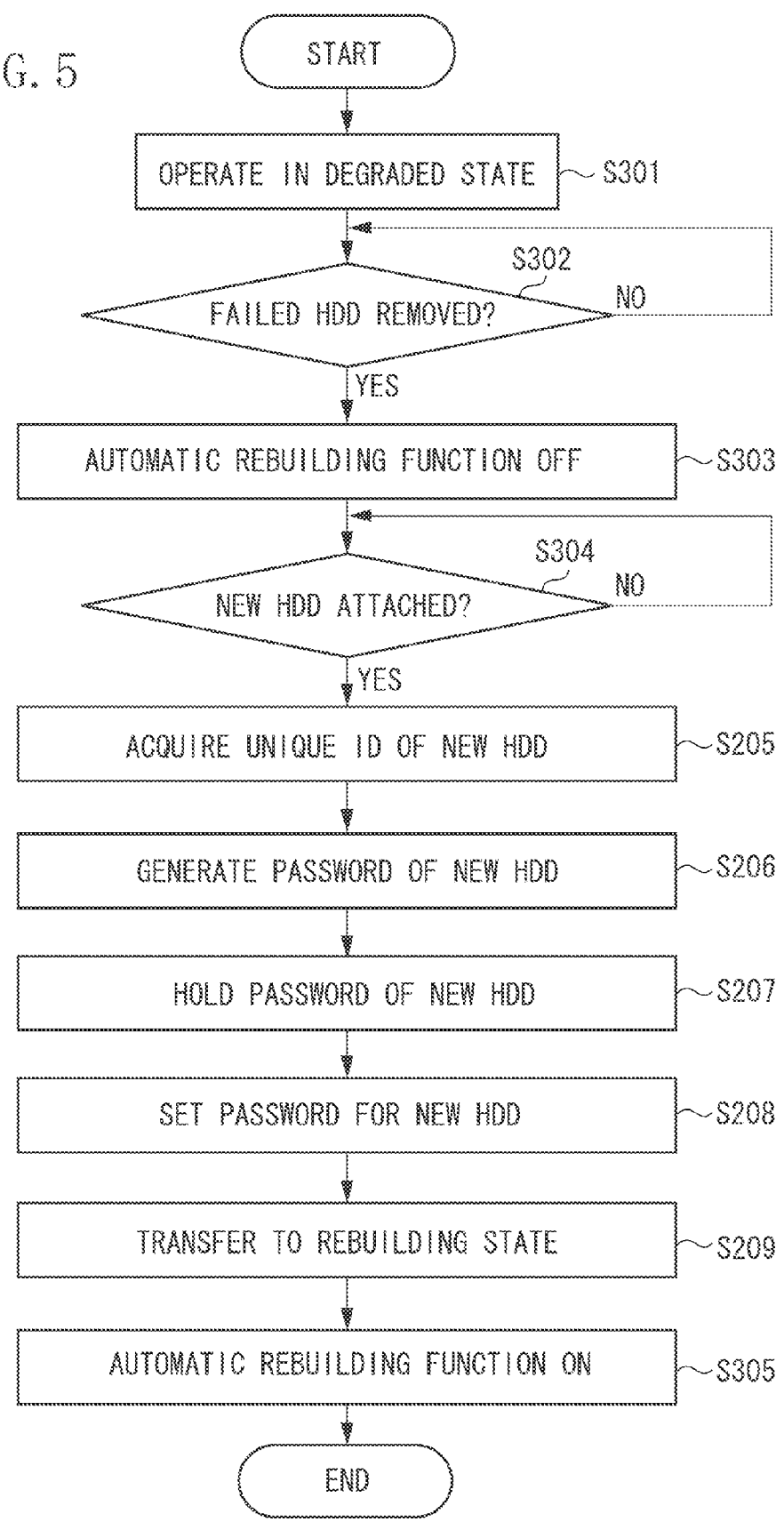
FIG. 5 is a flowchart illustrating password setting of an HDD according to a second exemplary embodiment.

FIG. 5 is a flowchart illustrating password setting of the HDD according to the second exemplary embodiment. The control process according to the present flowchart is realized by mainly by reading the program stored in the ROM 102 to the RAM 103 and executing the program by the CPU 101.

First, in step S301, the disk array device 200 operates in the degraded state.

Next, in step S302, the CPU 101 determines via the mirroring control unit 201 whether the failed HDD is removed. If YES in step S302, the operation proceeds to step S303. If NO in step S302, the CPU 101 stands by until the failed HDD is removed (YES in step S302).

If YES in step S302, specifically, if the CPU 101 detects that the failed HDD is removed, next in step S303, the CPU 101 accesses the data storage unit 202 via the mirroring control unit 201 and sets the automatic rebuilding function to OFF. The automatic rebuilding function is a function of executing the rebuilding automatically, when the HDD is replaced in the degraded state. The processing in step S303 may be performed during the degraded state.

Next, in step S304, the CPU 101 determines via the mirroring control unit 201 whether the new HDD has been attached. If YES in step S304, the operation proceeds to step S205. If NO in step S304, the CPU 101 stands by until the new HDD is attached (YES in step S304). In the present exemplary embodiment, since the automatic rebuilding function is set to OFF in step S303, even if the new HDD is attached in the degraded state, the new HDD will never immediately transfer to the rebuilding state. Conventionally, since the automatic rebuilding function is set to ON in the default setting, the new HDD will be transferred to the rebuilding state as soon as the new HDD is attached in the degraded state, and the rebuilding is executed before the password is set for the new HDD.

In steps S205 through S209, the processing similar to those in the first exemplary embodiment is performed.

Next, in step S305, the CPU 101 accesses the data storage unit 202 via the mirroring control unit 201 and sets the automatic rebuilding function to ON.

As described above, in the present exemplary embodiment, the CPU 101 controls to prohibit execution of the rebuilding on the HDD, for a period until a password is set for the newly connected HDD.

In parallel with this, the CPU 101 may control to prohibit write of data on the HDD corresponding to write command from the main controller, for a period until the password is set for the newly connected HDD.

According to the second exemplary embodiment, in the situation where one of the HDDs fails in the midst of execution of mirroring and the failed HDD is replaced with the new HDD, the following becomes possible. Specifically, it becomes possible to prevent the rebuilding from being executed on the newly attached HDD before the password is set for the newly attached HDD.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-274888 filed Dec. 15, 2011, which is hereby incorporated by reference herein in its entirety.

What is claimed is:

1. A control method for an information processing apparatus connected to a first storage device and a second storage device via a storage control device, the control method comprising:

detecting, when the storage control device operates in a mirroring mode, that the second storage device is connected to the information processing apparatus;

setting authentication information for the second storage device after the detection unit has detected that the second storage device is connected to the information processing apparatus; and copy data stored in the first storage device to the second storage device, after the setting unit has set the authentication information for the second storage device.

2. A non-transitory computer-readable storage medium storing a program for causing an information processing apparatus connected to a first storage device and a second storage device via a storage control device to execute operations, the operations comprising:

instructing the storage control device to transfer to a mode for writing data to the first storage device and the second storage device;

setting authentication information for the second storage device after the the storage control device has been instructed to transfer to the mode for writing data to the first storage device and the second storage device; and copying data stored in the first storage device to the second storage device after the authentication information for the second storage device has been set.

3. A non-transitory computer-readable storage medium storing a program for causing an information processing apparatus connected to a first storage device and a second storage device via a storage control device to execute operations, the operations comprising:

detecting, when the storage control device operates in a mirroring mode, that the second storage device is connected to the information processing apparatus;

setting authentication information for the second storage device after the detection unit has detected that the second storage device is connected to the information processing apparatus; and copy data stored in the first storage device to the second storage device, after the setting unit has set the authentication information for the second storage device.

4. A control method for an information processing apparatus connected to a first storage device and a second storage device via a storage control device, the control method comprising:

instructing the storage control device to transfer to a mode for writing data to the first storage device and the second storage device;

setting authentication information for the second storage device after the the storage control device has been instructed to transfer to the mode for writing data to the first storage device and the second storage device; and copying data stored in the first storage device to the second storage device after the authentication information for the second storage device has been set.

5. An information processing apparatus connected to a first storage device and a second storage device via a storage control device, the information processing apparatus comprising:

a detection unit configured, when the storage control device operates in a mirroring mode, to detect that the second storage device is connected to the information processing apparatus;

a setting unit configured to set authentication information for the second storage device after the detection unit has detected that the second storage device is connected to the information processing apparatus; and a copying unit configured to copy data stored in the first storage device to the second storage device after the setting unit has set the authentication information for the second storage device.

6. The information processing apparatus according to claim 5, wherein the second storage device, when a power source of the second storage device is turned ON, compares the authentication information set for the second storage device and authentication information held in the information processing apparatus to perform authentication, if the authentication is successful, permits access to the second storage device, and if the authentication fails, prohibits access to the second storage device.

7. The information processing apparatus according to claim 5, further comprising a detection unit configured to detect that the second storage device is removed from the information processing apparatus,
wherein the setting unit sets an automatic rebuilding function of the storage control device to OFF, in response to the fact that the detection unit detects that the second storage device is removed from the information processing apparatus.

8. An information processing apparatus connected to a first storage device and a second storage device via a storage control device, the information processing apparatus comprising:
an instruction unit configured to instruct the storage control device to transfer to a mode for writing data to the first storage device and the second storage device;
a setting unit configured to set authentication information for the second storage device after the instruction unit has instructed the storage control device to transfer to the mode for writing data to the first storage device and the second storage device; and
a copying unit configured to copy data stored in the first storage device to the second storage device after the setting unit has set the authentication information for the second storage device.

9. The information processing apparatus according to claim 8, wherein the storage control device, while operating in a single mode, if an instruction for transferring to the mode for writing data to the first storage device and the second storage device is given, transfers to a mirror state.

10. The information processing apparatus according to claim 8, wherein the second storage device, when a power source of the second storage device is turned ON, compares the authentication information set for the second storage device and authentication information held in the information processing apparatus to perform authentication, if the authentication is successful, permits access to the second storage device, and if the authentication fails, prohibits access to the second storage device.

11. The information processing apparatus according to claim 8, further comprising a prohibition unit configured to prohibit writing data to the second storage device until the authentication information is set for the second storage device.

12. The information processing apparatus according to claim 8, further comprising a prohibition unit configured to prohibit writing data to the second storage device until the authentication information is set for the second storage device.

13. The information processing apparatus according to claim 8, wherein the mode for writing data to the first storage device and the second storage device is a mirroring mode.

14. The information processing apparatus according to claim 8, wherein the authentication information is a password generated based on identification data of the second storage device.

15. The information processing apparatus according to claim 8, further comprising a specifying unit configured, when the storage control device operates in a single mode, to specify an initial rebuilding function of the storage control device as OFF,
wherein the instruction unit instructs the storage control device to transfer to the mode for writing data to the first storage device and the second storage device in a state where the initial rebuilding function of the storage control device is specified as OFF.

16. The information processing apparatus according to claim 15, further comprising a reception unit configured to receive an instruction for causing the storage control device to transfer to the mode for writing data to the first storage device and the second storage device,
wherein the specifying unit specifies an initial rebuilding function of the storage control device as OFF, in response to the fact that the reception unit has received the instruction.

* * * * *